E. R. KOONTZ.
BALING MACHINE.
APPLICATION FILED AUG. 19, 1918.
1,404,447.
Patented Jan. 24, 1922.
13 SHEETS—SHEET 6.
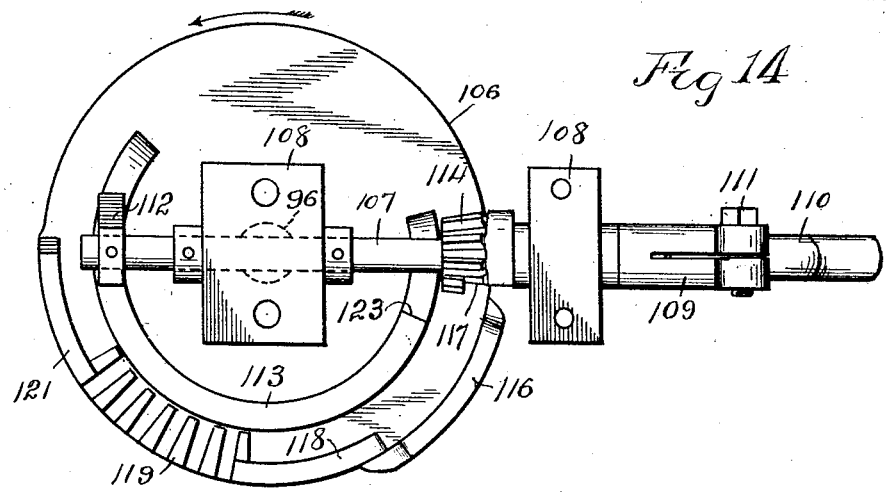
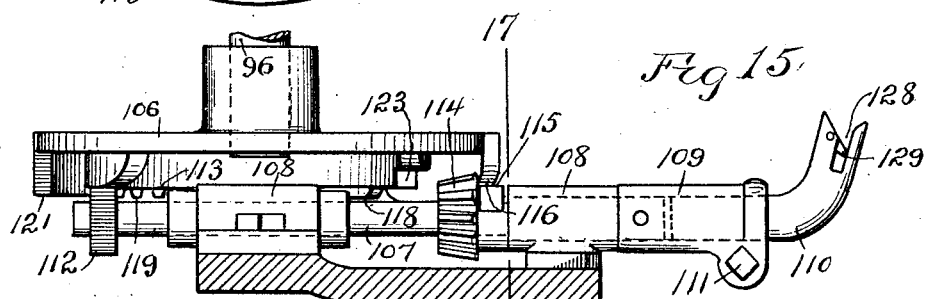
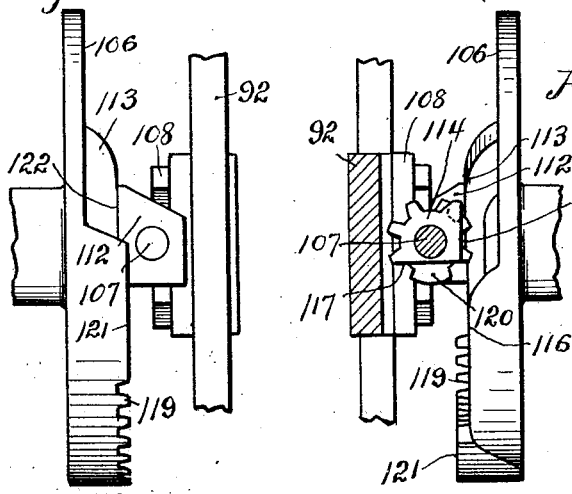

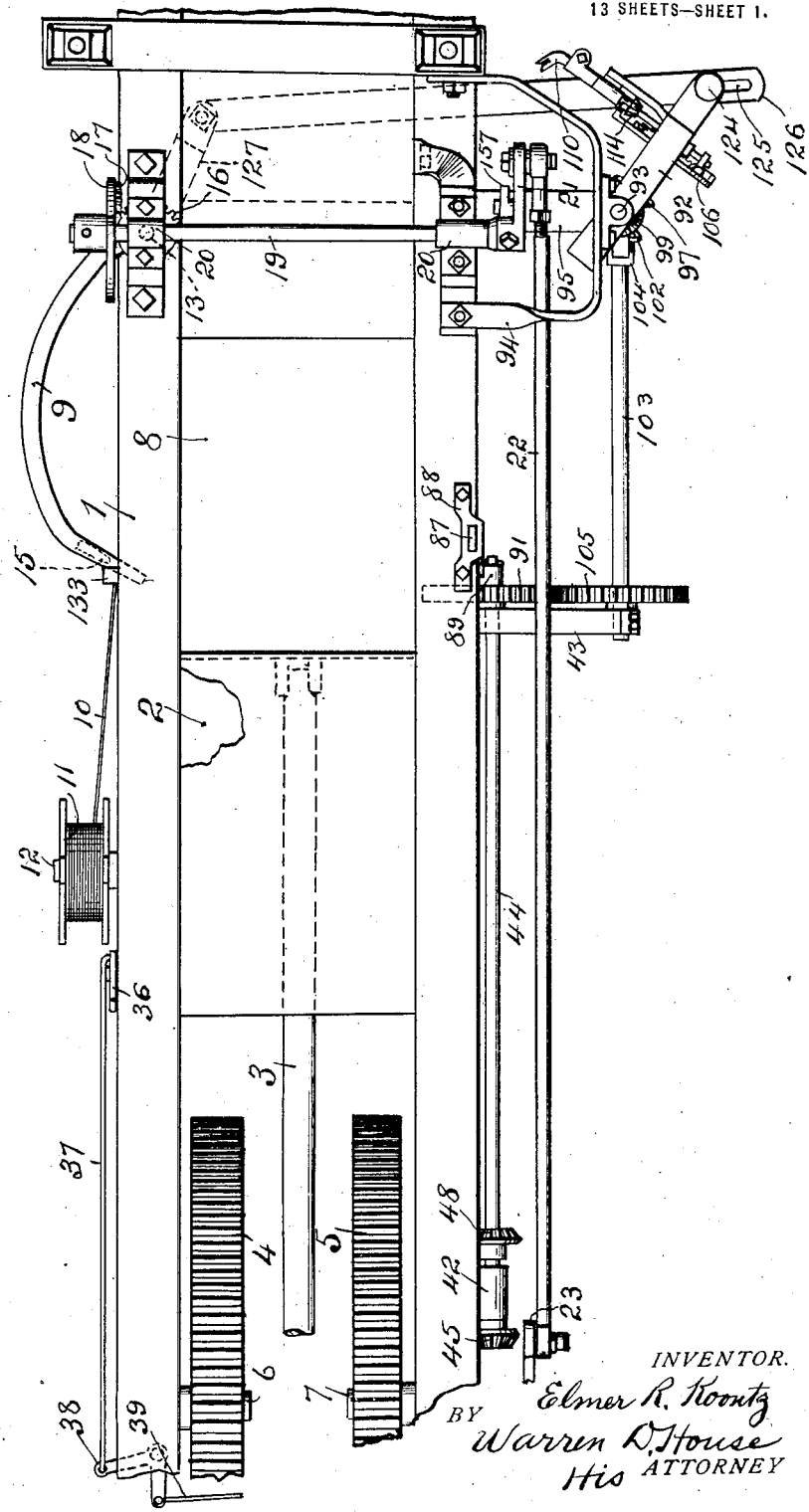

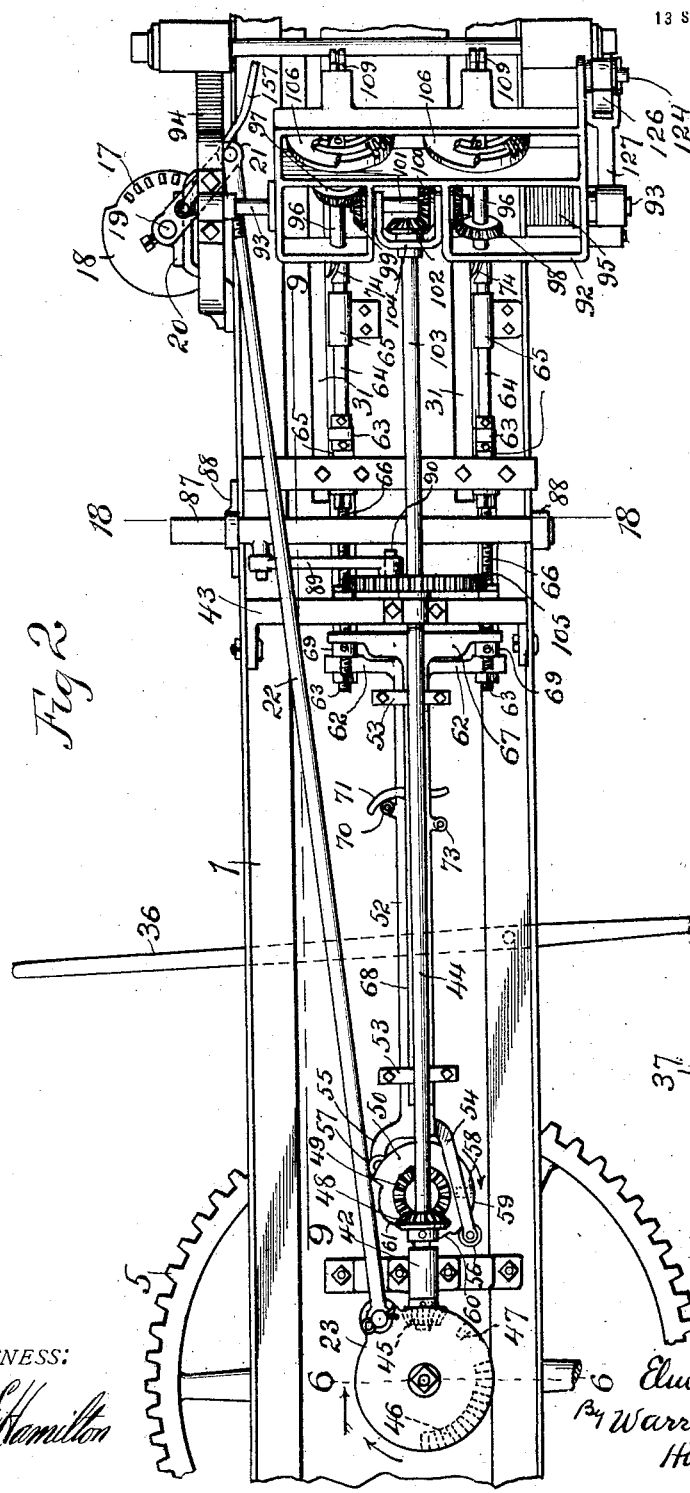

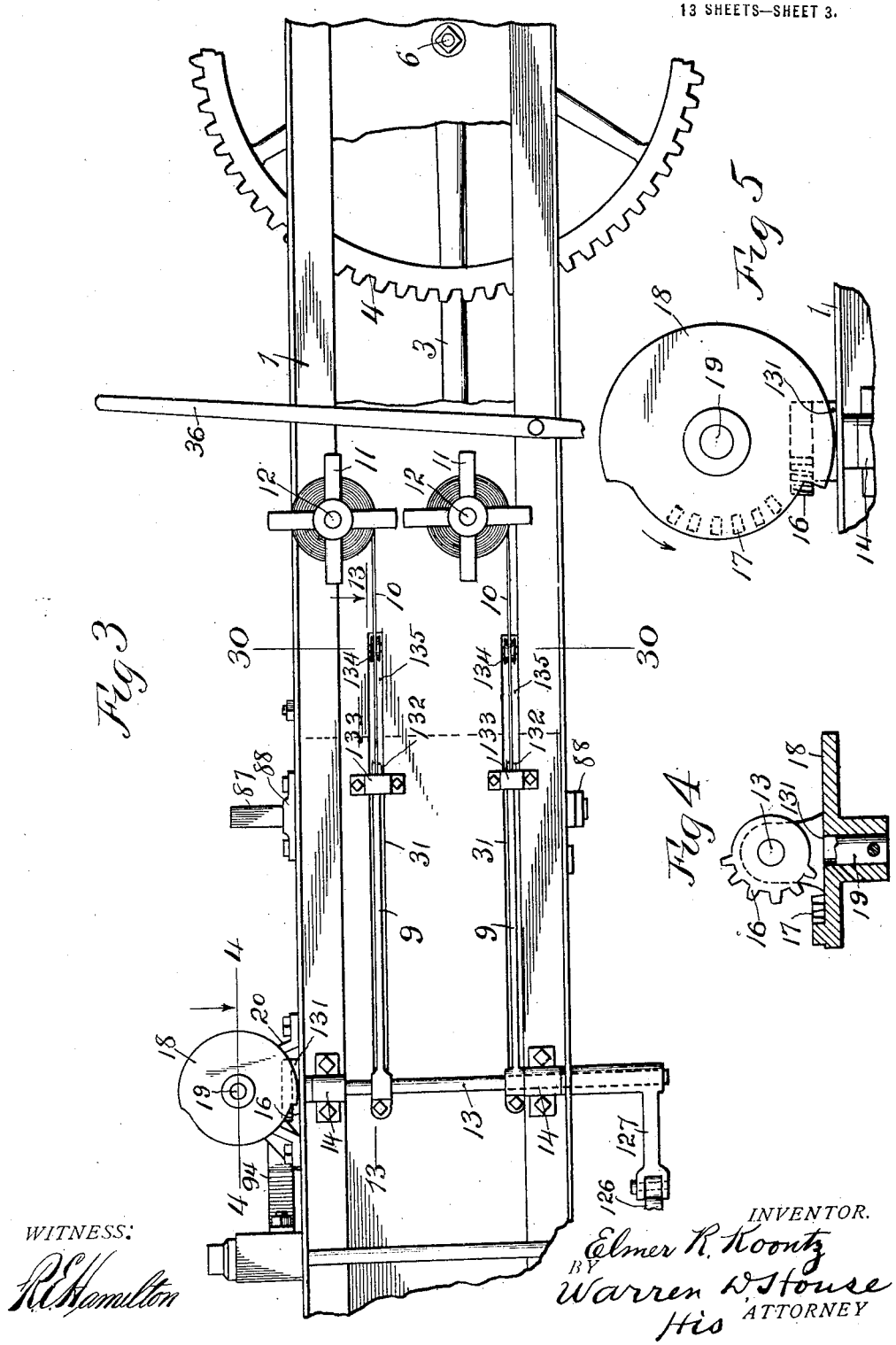

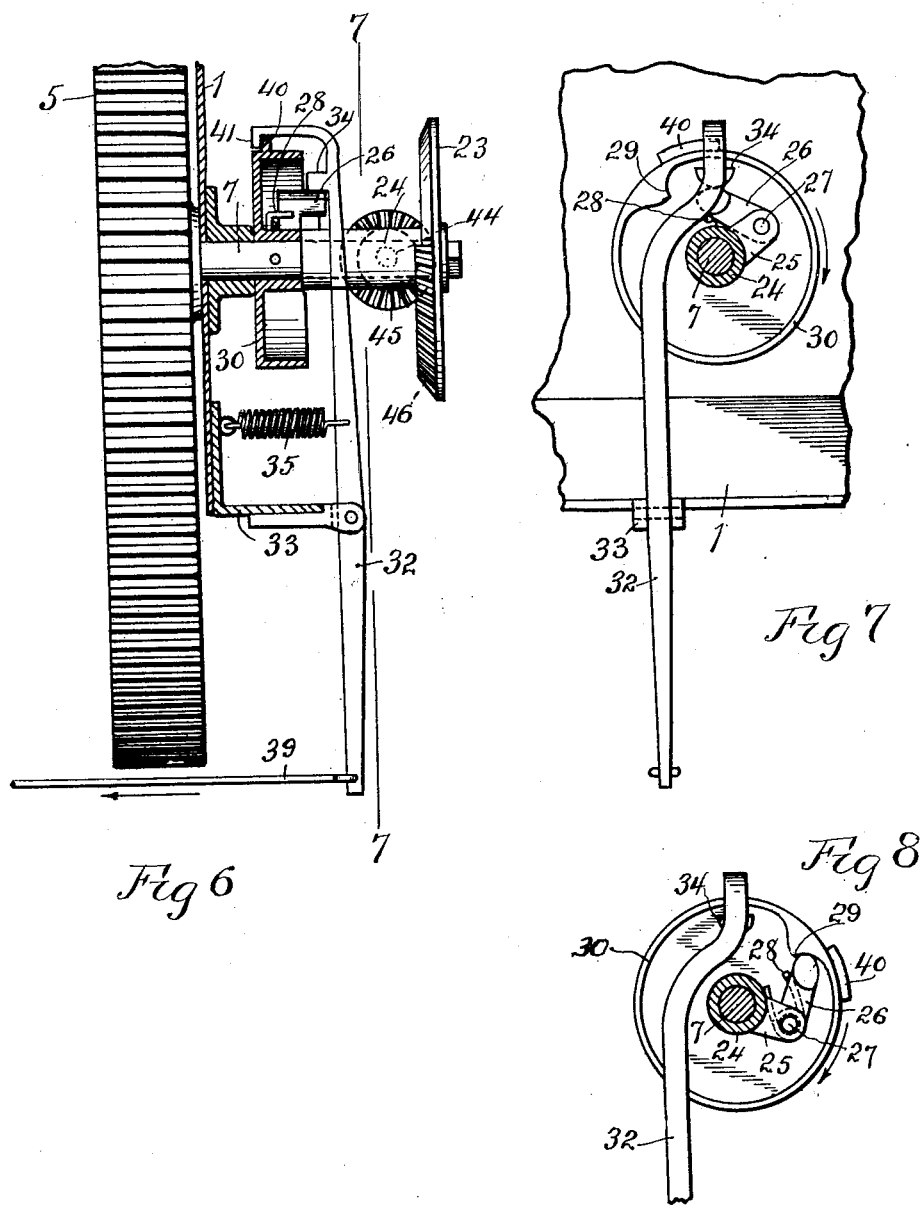

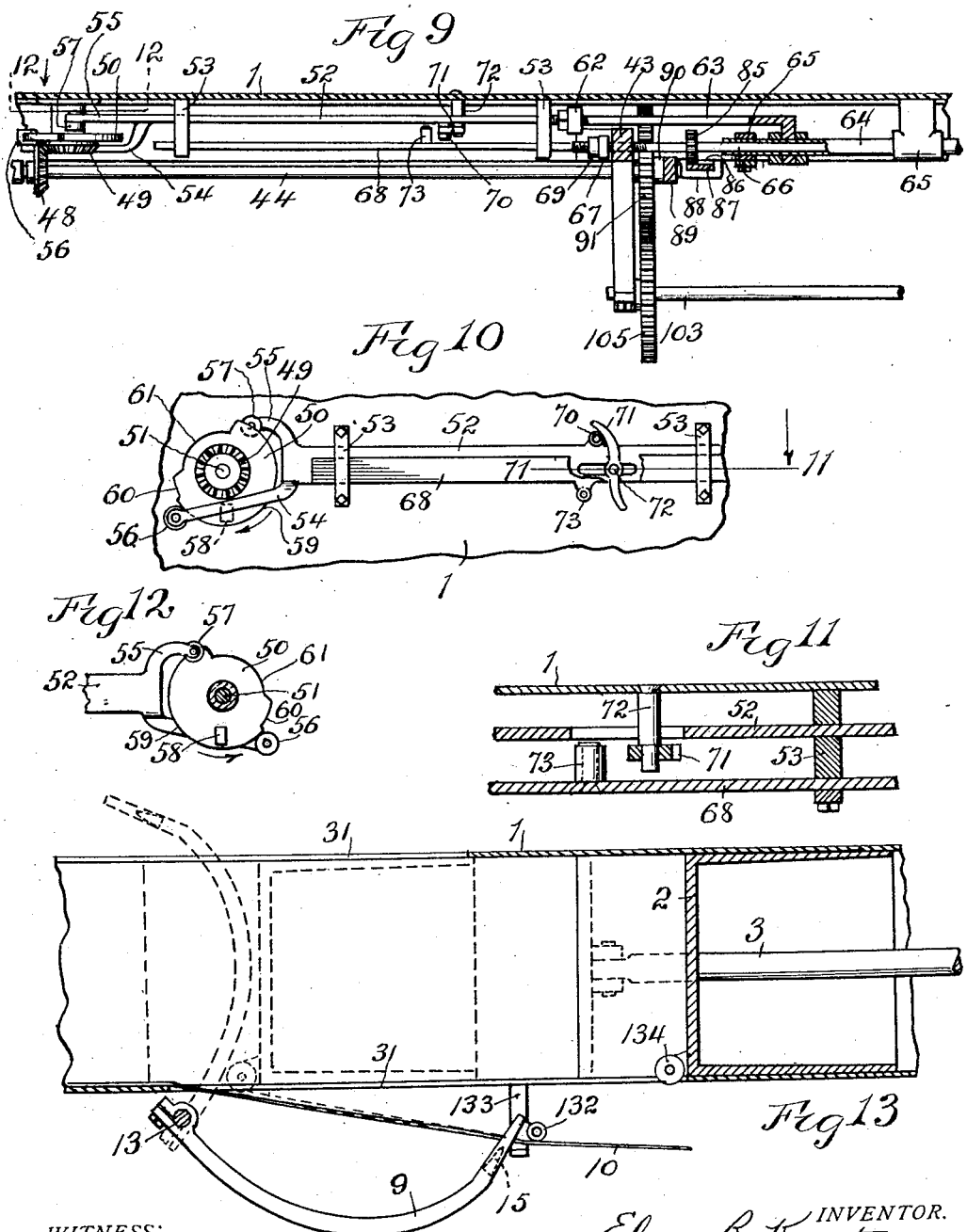

E. R. KOONTZ.
BALING MACHINE.
APPLICATION FILED AUG. 19, 1918.

1,404,447.

Patented Jan. 24, 1922.
13 SHEETS—SHEET 7.

WITNESS:
R. E. Hamilton

INVENTOR.
Elmer R. Koontz
BY Warren D. House
His ATTORNEY

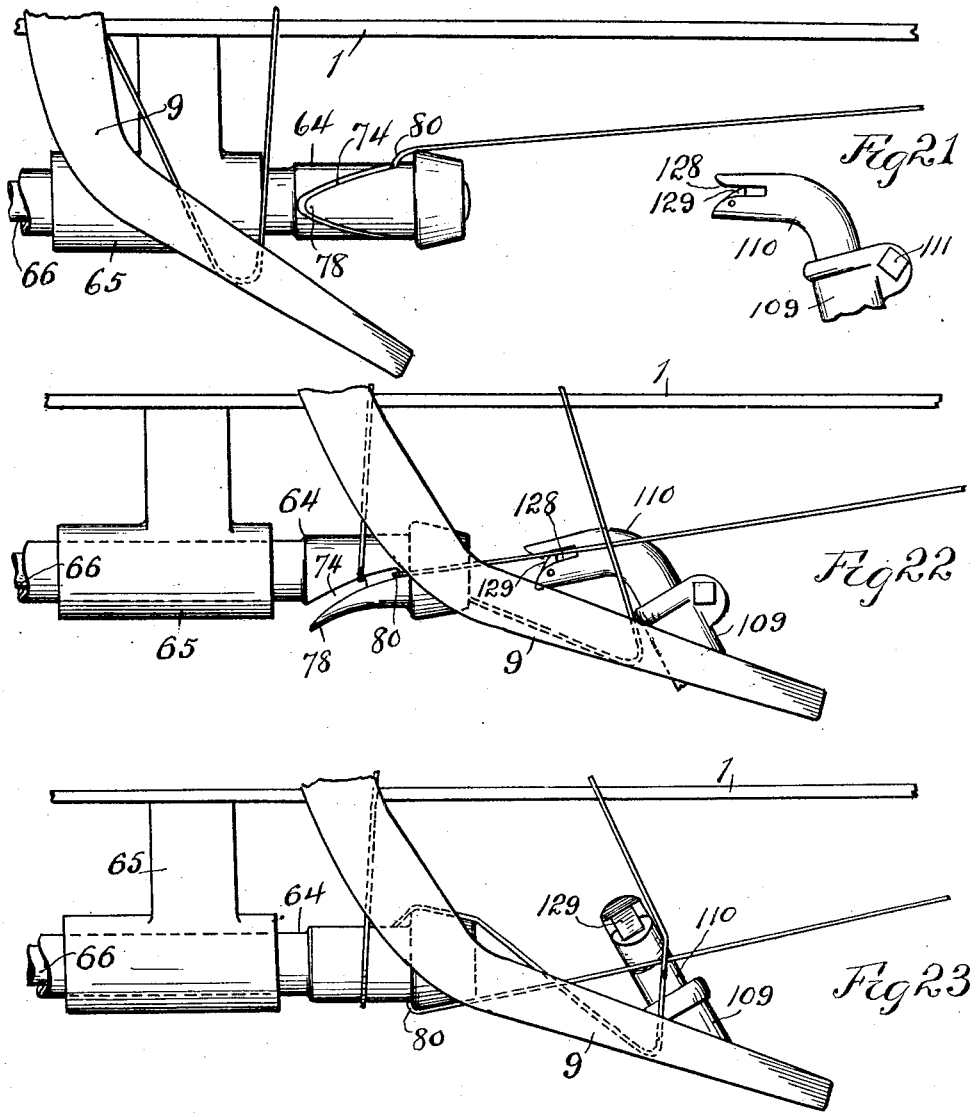

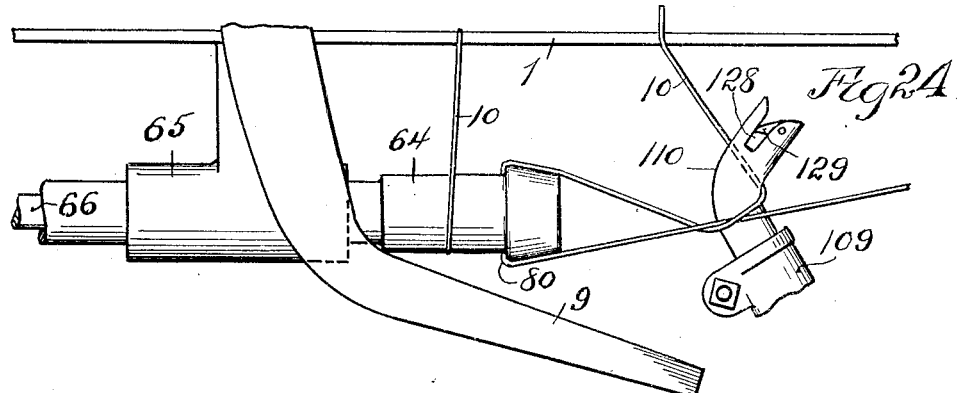
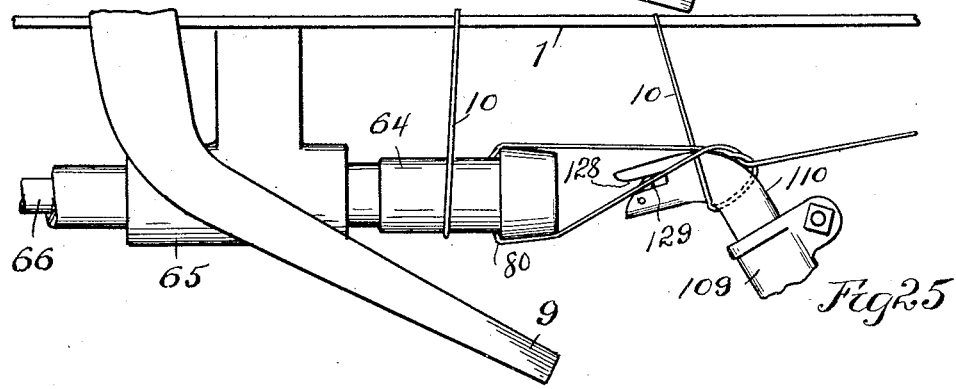
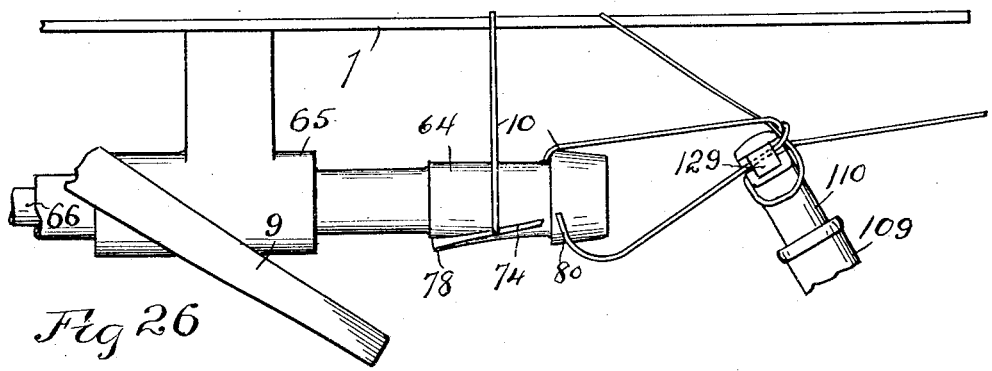

E. R. KOONTZ.
BALING MACHINE.
APPLICATION FILED AUG. 19, 1918.
1,404,447.
Patented Jan. 24, 1922.
13 SHEETS—SHEET 10.
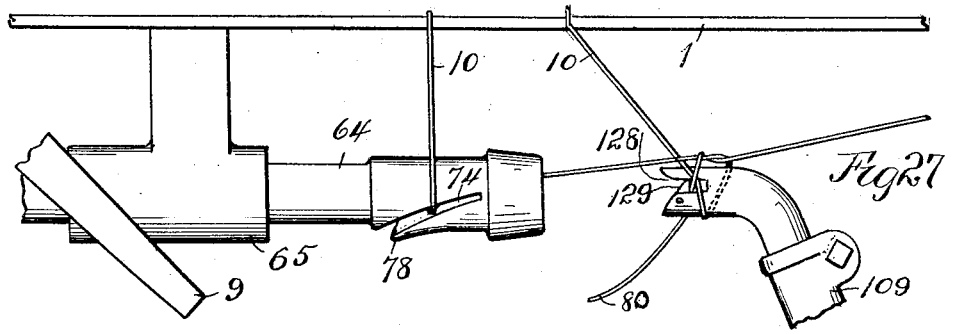
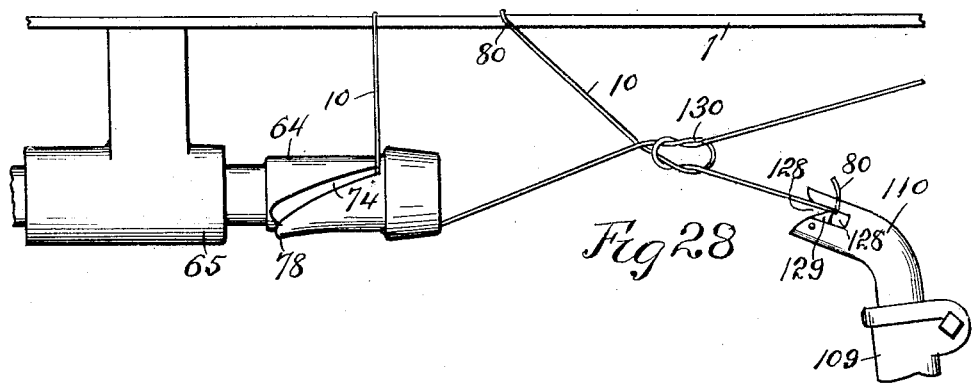
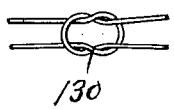
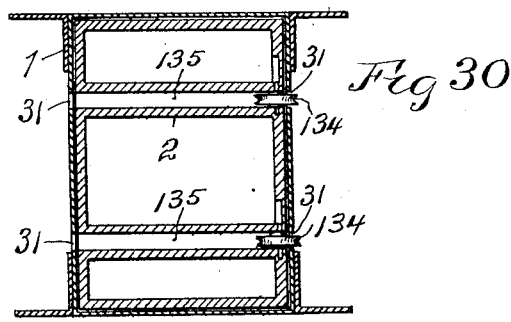
WITNESS:
R. E. Hamilton
INVENTOR.
Elmer R. Koontz
BY Warren D. House
His ATTORNEY

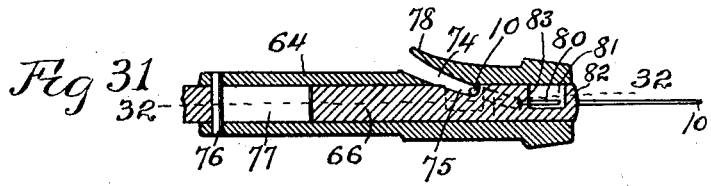
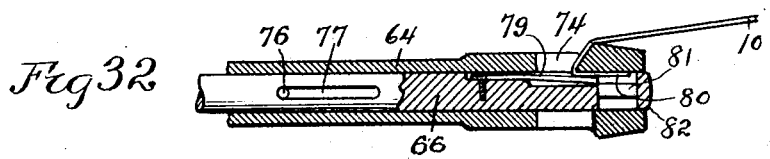
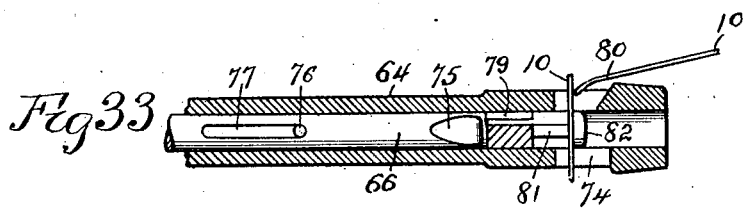
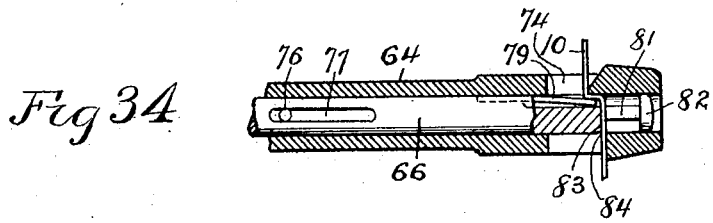
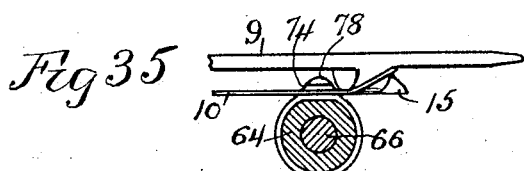
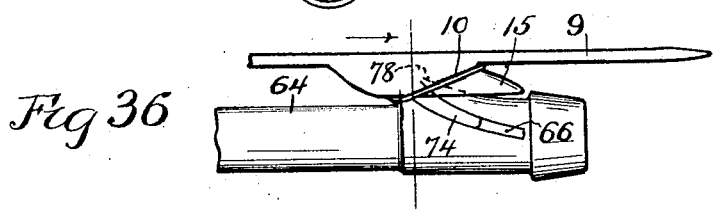

E. R. KOONTZ.
BALING MACHINE.
APPLICATION FILED AUG. 19, 1918.
1,404,447. Patented Jan. 24, 1922.
13 SHEETS—SHEET 13.
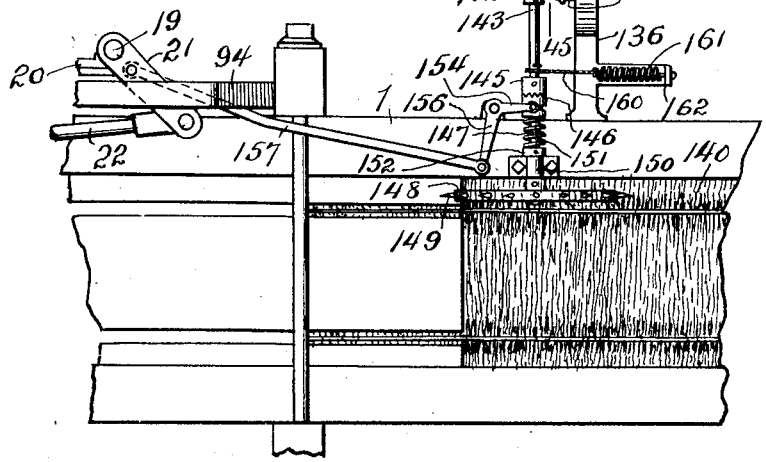
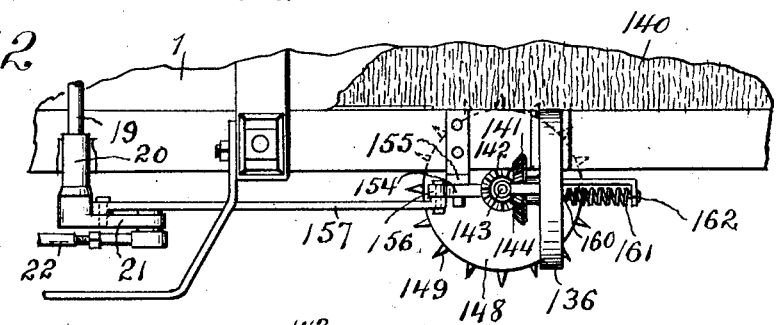
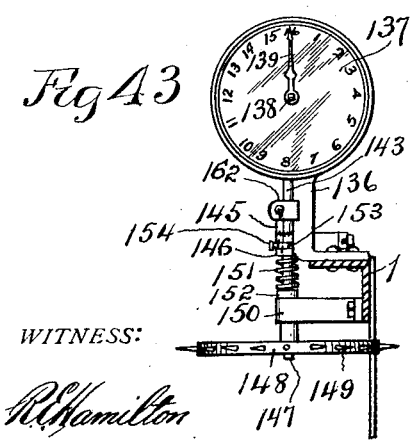
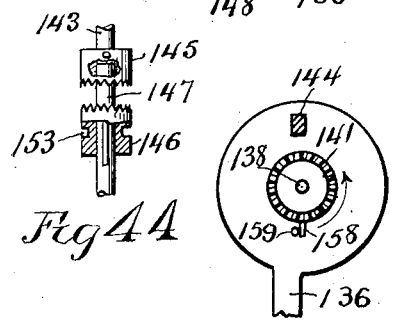
WITNESS:
R. E. Hamilton
INVENTOR.
Elmer R. Koontz
BY Warren D. House
His ATTORNEY

UNITED STATES PATENT OFFICE.

ELMER R. KOONTZ, OF RICHARDS, MISSOURI.

BALING MACHINE.

1,404,447. Specification of Letters Patent. Patented Jan. 24, 1922.

Application filed August 19, 1918. Serial No. 250,519.

*To all whom it may concern:*

Be it known that I, ELMER R. KOONTZ, a citizen of the United States, residing at Richards, in the county of Vernon and State of Missouri, have invented a certain new and useful Improvement in Baling Machines, of which the following is a specification.

My invention relates to improvements in baling machines. It relates particularly to machines for baling hay, straw or similar material.

One of the objects of my invention is to provide a baling machine which is rapid in operation, which will bind the bales tightly, which is cheap to manufacture, which is durable and not liable to get out of order, which requires a minimum amount of manual attention in its operation, and which will tie knots in the baling wire which will not slip nor untwist.

Still another object of my invention is the provision of novel knotting means, by means of which the knot is formed and completed and drawn tight before it is released.

My invention provides further novel means for operating the needles which carry the wires across the baling chamber.

Still another object of my invention is the provision of an indicator which indicates the length of the bale and which is provided with means by which the pointer of the indicator returns to its inital position automatically upon the completion of a bale.

A further object of my invention is the provision of means for forming a knot in the baling wire and for drawing the knot taut independently of the expansion or movement of the bale.

Other novel features of my invention are hereinafter fully described and claimed.

In the accompanying drawings, which illustrate the preferred embodiment of my invention, Fig. 1 is a plan view, partly broken away, of a baling machine provided with my improvement, parts being broken away.

Fig. 2 is a side elevation of the same, parts being broken away.

Fig. 3 is a view similar to Fig. 2, showing the opposite side of the machine.

Fig. 4 is a horizontal sectional view on the line 4—4 of Fig. 3.

Fig. 5 is an enlarged side elevation of two of the segmental gears, and parts connected therewith, which operate the needles.

Fig. 6 is an enlarged vertical sectional view on the line 6—6 of Fig. 2.

Fig. 7 is a vertical sectional view on the line 7—7 of Fig. 6.

Fig. 8 is a view in vertical section of some of the parts shown in Fig. 7, but in a different position.

Fig. 9 is a horizontal sectional view on the line 9—9 of Fig. 2, parts being removed and some broken away.

Fig. 10 is a side elevation of a portion of the mechanism for operating the knotters.

Fig. 11 is an enlarged horizontal section on the line 11—11 of Fig. 10.

Fig. 12 is a vertical sectional view on the line 12—12 of Fig. 9.

Fig. 13 is a horizontal sectional view on the line 13—13 of Fig. 3.

Fig. 14 is an enlarged elevation of one of the knotters and some of the parts connected therewith.

Fig. 15 is a top view of what is shown in Fig. 14 and the support therefor shown in horizontal section.

Fig. 16 is an edge elevation of what is shown in Fig. 14.

Fig. 17 is a vertical sectional view on the line 17—17 of Fig. 15.

Figure 18:
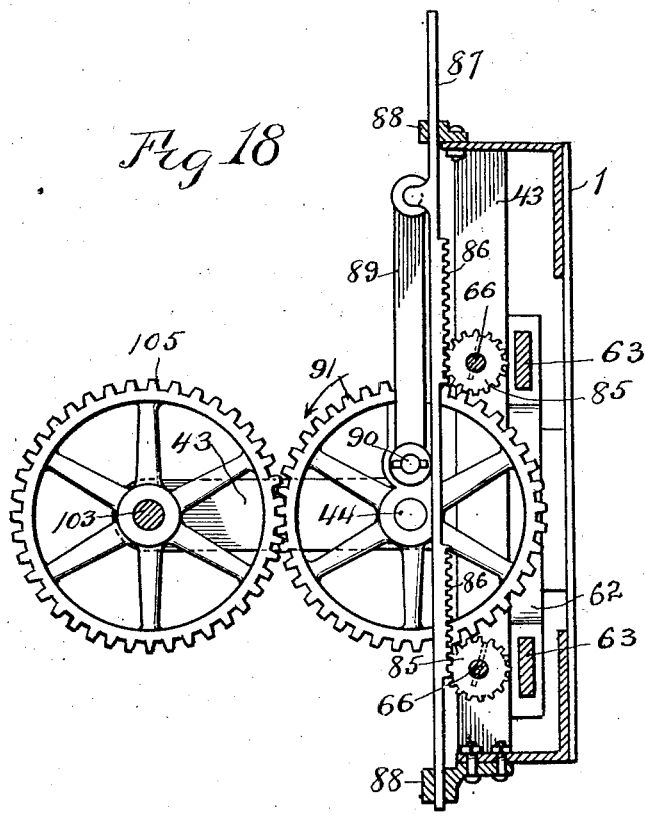
Fig. 18 is an enlarged vertical sectional view on the line 18—18 of Fig. 2.

Fig. 21 to Fig. 28 inclusive show different positions of two cooperating knotting members, and parts co-operating therewith, the parts being shown in plan.

Fig. 29 is a view of a knot which is formed by the knotting mechanism.

Fig. 30 is a vertical sectional view on the line 30—30 of Fig. 3.

Fig. 31 is a longitudinal vertical sectional view of one of the rotary wire holders and cutters, shown in its initial holding position, partly broken away.

Fig. 32 is a longitudinal sectional view on the line 32—32 of Fig. 31.

Fig. 33 is a view similar to Fig. 32, with the parts as shown in Fig. 26.

Fig. 34 is a view similar to Fig. 32, showing the position of the parts just prior to the wire being cut.

Fig. 35 is a cross section on the line 35—35 of Fig. 36.

Fig. 36 is a side elevation of a portion of one of the needles and one of the rotary wire holders and cutters in a position occupied by these parts just prior to the wire being carried into the mouth of the holder by the needle.

Figs. 37, 38, 39 and 40 are plan views showing respectively four different positions of the baling wire and a portion of the baling chamber, and some of the parts co-operating therewith.

Fig. 41 is a side elevation of a portion of the baling chamber, the length of bale indicator, and parts connected therewith.

Fig. 42 is a top view of what is shown in Fig. 41.

Fig. 43 is a vertical sectional view of what is shown in Fig. 41.

Fig. 44 is an enlarged view, partly in side elevation and partly in vertical section of the clutch for operating the length of bale indicator.

Fig. 45 is a vertical sectional view on the line 45—45 of Fig. 41.

Similar reference characters designate similar parts in the different views.

1 designates the frame work of the baling chamber, which is of the usual type and which has reciprocatively mounted in it an ordinary plunger 2 having a connecting rod 3 pivotally connected to and between two large driving spur gear wheels 4 and 5, Fig. 1, to which are respectively secured two horizontal shafts 6 and 7, which are rotatably mounted in opposite sides respectively of the frame 1.

My invention provides means for passing a wire around a bale which is formed in the usual manner in the baling chamber, by hay or other material which is fed into the baling chamber in front of the plunger 2 through a feed opening 8 in the top of the baling chamber in the usual manner.

On one side of the baling chamber are provided means for holding the ends of the baling wire, and for knotting the wire which has been passed around a completed bale, such wire holding and knotting means will be hereinafter described.

Upon the opposite side of the baling chamber, I provide two oscillatable needles 9, see Figs. 1, 3 and 13, which are respectively adapted to engage two baling wires 10, which are respectively withdrawn from two reels 11, which are rotatably mounted, one above the other, on horizontal studs 12 secured to the adjacent side of the frame work 1, Fig. 3.

The two needles 9 are curved and are rigidly secured one above the other to a vertical shaft 13, Figs. 1 and 3, which is rotatable in boxes 14 secured to the outer side of the frame 1.

As shown in Figs. 35 and 36, and also in Fig. 13, the under side of each needle 9, near its forward end, is provided with a forwardly extending lip 15, which is adapted to pass under and engage the adjacent baling wire 10.

The function of the needles 9 is to carry the wires 10 through the baling chamber to the other side thereof at the rear of the completed bale. In order that the needles may be swung from the position shown in solid lines in Fig. 13, which is their initial position, to the position shown in dotted lines in said figure, and then back to the initial position, the shaft 13 is oscillated by means of the following described mechanism.

Referring now to Figs. 1, 3, 4 and 5, 16 designates a segmental gear wheel which is rigidly secured to the upper end of the shaft 13, and the teeth of which gear wheel are adapted to operatively engage a series of gear teeth 17, which are provided on the inner side of a disk 18, which is rigidly secured to one end of a horizontal transverse shaft 19, which is rotatably mounted in boxes 20 which are secured to the upper side of the frame 1.

Secured to the other end of the shaft 19 is a crank 21, to which is pivoted one end of a longitudinal rod 22, the other end of which is pivoted to the outer side of a disk 23, see also Figs. 6 to 8, which is provided with a hub 24, which is rotatably mounted on the shaft 7.

In order that the disk 23 may be periodically rotated at the proper times, by means of the constantly revolving shaft 7, the hub 24 is provided with a crank arm 25, to which is pivoted a pawl 26 by means of a transverse pin 27 which is secured to the arm 25, see Figs. 6 to 8. A spring 28 which encircles the pin 27 normally forces the pawl 26 outwardly in position for it to operatively engage a shoulder 29 which is provided on the inner side of the rim of a wheel 30 which is rigidly secured to the shaft 7 between the frame 1 and the hub 24. When the pawl 26 thus engages the shoulder 29, the disk 23 will be carried around one revolution, thereby oscillating, by means of the rod 22, the crank arm 21, thus swinging the needles 9 from their initial position with the wires 10 which they engage across the baling chamber and then back to the initial position through the intermediacy of the shaft 19, disk 18, gear 16, and shaft 13. To permit the passage of the needles 9 through the side walls of the frame 1, the latter is provided with four longitudinal slots 31, two in each side of the frame work 1, Figs. 2 and 3.

For withdrawing the pawl 26 from the shoulder 29, and for normally holding it out of the path of the shoulder, there is provided a vertical lever 32, Figs. 6 to 8, which, intermediate of its ends, is pivoted on a longitudinal horizontal axis to a bracket 33 which is secured to the adjacent sides of the frame 1. The inner side of the lever 32 is provided with an inwardly extending lug 34, which, when the lever 32 is in its initial position shown in Fig. 6, is in the path of the pawl 26 and is adapted to engage the upper side of said pawl as the latter passes under the lug 34 and to depress the pawl against the pressure of the spring 28, so that the pawl will be forced inwardly out of the path of the shoulder 29 as shown in Figs. 6 and 7.

A horizontal coil spring 35, Fig. 6, attached to the bracket 33 and to the lever 32 above the axis of the latter, normally holds the lever 32 in a position in which the lug 34 is in the path of movement of the pawl 26. If the upper end of the lever 32 is swung outwardly a sufficient distance, the lug 34 will release the pawl 26 and the latter will be forced by the spring 28 into the path of the shoulder 29. When this has been done, the lever 32 is released and the spring 35 forces it to the initial position shown in Figs. 6 and 7, so that when the disk 23 has made one revolution, the lug 34 will force the pawl 26 inwardly out of engagement with the shoulder 29, and there will be no further turning of the disk 23 until the lever 32 is again swung to release the pawl 26 from the lug 34.

For manually swinging outwardly the upper end of the lever 32, after a bale has been formed and it is desired to bind it with the wires 10, there is provided a manually operated lever 36 which is pivoted to the frame 1 on a horizontal axis, and which has pivoted to its lower end a rod 37 which is pivoted to a bell crank lever 38, mounted on a vertical axis on the lower side of the frame 1, and which is connected by a horizontal transverse rod 39 with the lower end of the lever 32.

In order that the lever 32 can not be swung to release the pawl 26 from the lug 34 when the shoulder 29 is directly over the pawl 26, there is provided on the periphery of the wheel 30 a flange 40, which is adapted to have its inner side engage a projection 41, which extends downwardly from the inwardly turned upper end of the lever 32. The flange 40 is so located on the wheel 30 that it will obstruct the outward movement of the upper end of the lever 32 when the shoulder 29 is over the pawl 26.

For holding the wires 10 after they have been passed around a completed bale and for knotting and cutting the wires, the following described mechanism is employed.

Rotatable in suitable bearings 42 and 43, which are secured to the side wall of the frame 1 adjacent to the disk 23 is a longitudinal shaft 44, to the rear end of which is secured a gear wheel 45, Figs. 1 and 2, and Fig. 6, which is adapted to engage with and be driven by a row of gear teeth 46 and a gear tooth 47, Fig. 2, which are provided on the inner side and extend about a quarter of the circumference of the disk 23. The single tooth 47 is spaced apart from the teeth 46 to provide a period at which the shaft 44 is at rest when the knots are being tightened in the baling wires 10, as will be hereinafter described.

Secured to the shaft 44 is a gear wheel 48 which meshes with a gear wheel 49 of like diameter which is rigidly secured to a cam disk 50, which is rotatably mounted on a horizontal stud 51, which extends outwardly from the adjacent side of the frame 1, see Figs. 2 and 9 to 12.

The function of the cam disk 50 is to move forwardly and rearwardly a longitudinal bar 52 which is longitudinally slidable in bearings 53 secured to the adjacent side of the frame 1. The rear end of the slide bar 52 is provided with two rearwardly extending arms 54 and 55 on which are respectively rotatably mounted two rollers 56 and 57, best shown in Figs. 2, 9, 10 and 12. The roller 56 travels upon the periphery of the disk 50 and serves to draw rearwardly and to hold in the initial position the slide bar 52. On the inner side of the cam disk 50 is a lug 58 which is adapted to engage the roller 57 for the purpose of forcing the slide bar 52 forwardly.

As shown in Figs. 10 and 12, the cam disk 50 is provided with a peripheral portion 59 which is concentric with the axis of the cam and which serves to force the roller 56 to and hold it in the initial rearward position. The cam disk 50 is provided also with a peripheral portion 60 which engages the roller 56 at the time that the knots in the baling wires are being tightened. The cam disk 50 is also provided with a peripheral recess portion 61 which permits the slide bar 52 to be moved forwardly when the lug 58 engages the roller 57, and when the baling wires are being tightened by being wound around the knotter heads as hereinafter described.

The forward end of the slide bar 52 is provided with a T-shaped head 62, the arms of which extend vertically upwardly and downwardly, as shown in Fig. 2.

Two longitudinal plates 63 have their rear ends rigidly attached to the two vertical arms of the head 62. The forward ends of the plates 63 extend outwardly and are respectively rotatably attached to two rotary tubular knotter members 64, which are alike in construction and which are respectively longitudinally slidable in two bearings 65 which are secured to the adjacent side of the frame 1, as is best shown in Figs. 2 and 9.

Longitudinally slidable in the tubular knotter members 64 respectively are two rods 66 which extend through and are rotatable in the bearing 43 and which extend through and are rotatable in the T-shaped head 67 provided at the forward end of a longitudinal plate 68 which is slidably mounted at the outer side of the slide bar 52 in the bearings 53, as is best shown in Figs. 2, 9 to 11 and Fig. 18.

Secured to the rods 66 respectively, at the rear side of the head 67, are two collars 69, which are adapted to be engaged by the head 67, for the purpose of drawing rearwardly the rods 66, when the slide bar 62 is moved forwardly by the lug 58, striking the roller 57.

For effecting the last named function, the slide bar 52 carries a roller 70, which is adapted to engage the rear edge of a lever 71, Figs. 2, 9, 10 and 11, above the pivotal point of the latter. The lever 71 is pivoted near its middle upon an outwardly extending horizontal stud 72 which is secured to the adjacent side of the frame 1. The rear edge of the lever 71 below the stud 72 is adapted to strike a roller 73 which is rotatably mounted upon the inner side of the slide bar or plate 68.

The two members 66 and the two tubular wire holding members 64 are alike in construction, so that a description of one set of these members will suffice for both.

Referring particularly to Figs. 31 to 36, it will be noted that each member 64 on its upper side near its forward end is provided with a mouth 74 which extends downwardly and forwardly obliquely and is adapted to communicate with a notch 75 provided in the upper side of the rod 66 for receiving one of the baling wires 10.

Secured vertically in the member 64 is a pin 76 which extends through and is slidable in a slot 77 disposed longitudinally in the rod 66. The upper side of the member 64 above the mouth 74 is provided with an upwardly and rearwardly inclined lip 78, which is adapted to guide the wire 10 into the mouth 74.

Secured rigidly at its rear end to the inner side of the rod 66 is a spring plate 79, which, when the rod 66 is in the forward position, shown in Figs. 31 and 32 is adapted to tightly clamp the forward or held end of the baling wire, such forward end being designated by 80.

After the wire 10 has been carried by the needle 9 across the baling chamber and into the mouth 74, as shown in Fig. 31, and the held end 80 of the wire has been released, after the knot has been tied, but before the wire has been cut, the lug 58 on the cam disk 50 strikes the roller 57, thus forcing the slide bar 52 forwardly and with it the tubular member 64. The roller 70 through the intermediacy of the lever 71 and roller 73 forces the rod 66 rearwardly to the position shown in Fig. 33, thereby permitting the wire which has been last deposited in the mouth 74, to enter a notch 81 which is provided in the upper side and near the forward end of the rod 66. When the rod 66 is thus retracted, and the member 64 moved forwardly to the positions shown in Fig. 33, the head 82 which is at the forward end of the rod 66 will force the held end 80 of the wire 10 rearwardly to a point where it will be released from the clamping action of the spring plate 79, after which the held end 80 of the wire will be released, as shown in Figs. 26, 27 and 33. At this time, the roller 56 will be in the peripheral recess 61 of the cam 50.

As the cam 50 revolves, in the direction indicated by the arrows in Figs. 10 and 12, and in Fig. 2, the roller 56 will pass upon the peripheral portion 60 of the cam 50, thus drawing rearwardly the slide bar 52 and with it the member 64, thus forcing the wire 10, which is in the mouth 74, between the spring plate 79 and the member 64, as shown in Fig. 34. At this time, the knot will be drawn tight, and the members 64 and 66 will remain motionless, the gear 45 being at this time between the teeth 46 and the single tooth 47.

After the knot has been tightened, as will hereinafter be more fully explained, the tooth 47 will engage the gear 45, thereby revolving the shaft 44 and the cam 50, so that the roller 56 will pass out of the peripheral portion 60 and will pass onto the portion 59 to the position shown in Fig. 2, at which time the gear 45 will be released from the tooth 47 and the disk 23, and rotation of the shaft 44 will cease. At this time, the parts will all be in the initial position shown in Figs. 1, 2 and 31, and a cycle in the operation of the machine will have been effected. As the roller 56 passes from the peripheral portion 60 onto the peripheral portion 59 of the cam disk 50, the knotter member 64 will pass from the position shown in Fig. 34 to the initial position shown in Fig. 31, and in passing to the last named position, the rear wall 83 of the recess 81 will cut the wire 10 at a point 84, Fig. 34, at the forward end of the mouth 74. This will occur following the tightening of the knot and subsequent to the movement of the parts to the position shown in Fig. 28.

I will now describe the other parts of the knotting mechanism and how the knotting is effected.

For reasons hereafter explained, the knotter members 64 and 66, during the making of the knots must be rotated half a revolution and then retracted to the initial position shown in Figs. 2, 18 and 21.

As the rods 66 are connected by the pins 76 with the tubular members 64, rotation of the rods 66 will be transmitted to the members 64. Respectively rigidly secured to the rods 66 are two spur gear wheels 85 which respectively mesh with two sets of gear teeth 86, which are provided one above the other on the inner side of a vertical bar 87, Fig. 18, and Figs. 2 and 9, the bar 87 being vertically slidable in two bearings 88 secured one above the other to the frame 1.

Vertical reciprocation of the bar 87 is obtained by means of a bar 89, the upper end of which is pivoted to the bar 87, and the lower end of which is pivoted to a crank pin 90, which is secured to a spur gear wheel 91 which in turn is rigidly secured to the forward end of the shaft 44. The arrangement of the parts is such that upon the downward stroke of the bar 87, the rods 66 and the tubular members 64 will be turned counter-clockwise, as viewed in Fig. 18, one-half a revolution, and upon the upward stroke of the rack bar 87, the members 66 and 64 will be retracted to the initial position shown in Figs. 2, 21 and 31.

A substantially rectangular vertical frame 92, Figs. 1 and 2, is provided at its upper and lower ends respectively with two trunnions 93 which are respectively pivotally mounted in two brackets 94 and 95 disposed one above the other and secured rigidly to the frame 1. Rotatably mounted one above the other in the frame 92 are two horizontal shafts 96 to which are respectively secured two bevel gear wheels 97 and 98 which respectively mesh with two bevel gear wheels 99 and 100, which are rigidly secured, Fig. 2, to a vertical shaft 101 rotatably mounted in the frame 92. Meshing with the gear wheel 100 is a bevel gear wheel 102 which is rigidly secured to the forward end of a longitudinal shaft 103, the forward end of which is rotatably mounted in a yoke 104, the arms of which are pivoted to the shaft 101. The rear end of the shaft 103 is rotatably mounted in the bearing 43. Rigidly secured to the shaft 103 is a spur gear wheel 105, which meshes with the spur gear wheel 91.

When the shaft 44 is rotated, rotation will be imparted to the shafts 96 in a like direction through the intermediacy of the mechanism last described.

As shown in Fig. 2, the shafts 96 are respectively disposed in the same horizontal planes, as the tubular knotter members 64. Rigidly secured to the shafts 96 respectively are two substantially circular members 106, which are alike in construction and mode of operation, so that a description of one will answer for both.

Referring particularly to Figs. 14 to 17, 107 designates a horizontal shaft rotatably mounted in bearings 108 and having secured to it a tubular split clamping member 109 in which is mounted a knotter head 110 which is held tightly clamped by the member 109 by means of a screw 111.

Rigidly secured to the shaft 107 is a plate 112, which is adapted to travel on an arcuate track 113 provided on the member 106 concentric with the shaft 96, and by which the shaft 107 is held from rotation during a part of the revolution of the member 106. The bearings 108 are secured to the oscillatable frame 92.

Rigidly secured to the shaft 107 is a segmental gear 114 which is provided with a flattened portion 115 on its hub, which is adapted to engage an arcuate flange or track 116 on the member 106, for holding the shaft 107 from turning after the plate 112 has passed off from the track 113. On the gear 114 is a flat portion 117, disposed at right angles to the flat portion 115, and adapted to engage a curved flange or track 118 just as the surface 115 is leaving the track 116. At this time the portion 117 strikes the end of the track 118, causing the gear 114 and shaft 107 to turn one fourth of a revolution, so that the knotter head 110 is turned from the initial position shown in Figs. 1, 14 and 22 to the position shown in Fig. 23.

The track 118 terminates at its other end at the beginning of a series of gear teeth 119, the first of the series being struck by a tooth 120 on the gear 114 so as to turn the gear wheel into operative engagement with the teeth 119. Upon the rotation of the member 106, the teeth 119 will turn the shaft 107 one complete revolution, making a total of one and one fourth revolutions made by the shaft and the knotter head 110. After the shaft has been revolved by the teeth 119, the flat portion 117 of the segmental gear wheel 114 passes onto an arcuate flange or track 121 on the member 106, which track holds the knotter 110 in the position shown in Figs. 23 and 26 until the flat edge 122 of the plate 112 strikes the abrupt end 123 of the track 113, at which time the plate 112 will be forced with the shaft 107 and knotter 110 by the track 113 to the initial position shown in Fig. 14. The track 113 will hold the shaft 107 and knotter head in this position until the member 106 has rotated a complete revolution and reaches the initial position, shown in Figs. 2 and 14, at which time, the gear wheel 45 will have become disengaged from the teeth in the disk 23 and the rotation of the shaft 44 and parts driven thereby will stop, with all the parts of the knotter mechanism in their initial starting positions.

From the foregoing it will be understood, that the initial positions of the parts are those shown in Fig. 14, and that when the member 106 is revolved in the direction indicated by the arrow in Fig. 14, the plate 112 will pass off from the track 113 and the flat portion 115 of the gear 114 will engage the track 116, thus keeping the knotter head 110 in the first position; then when the flat portion 115 passes off from the track 116, the flat portion 117 will strike the adjacent end of the track 118, thereby revolving the knotter head one fourth revolution to the position shown in Fig. 23 in which position it will be held until the tooth 120 strikes the first tooth of the series 119, at which time the continued revolution of the member 106 will rotate the knotter head, first to the position shown in Fig. 24, then to the position shown in Fig. 25, and finally to the position shown in Fig. 26, in which position the knotter will be held by the flat portion 117 engaging the track 121, until the flat edge 122 of the plate 112 strikes the end 123 of the track 113 and turns the knotter head 110 in the reverse direction one quarter revolution, or back to the original position as shown in Fig. 27, which position will be retained by the knotter head, due to the engagement of the track 113 by the flat edge 122 of the plate 112 until the member 106 has made a complete revolution and stops at its initial position shown in Figs. 1 and 14.

These different movements of the knotter head 110 are required in making and tying a knot in the wire 10, and the knotter head operates in conjunction with the tubular knotter member 64 in forming and tightening the knot.

To bring the knotter heads 110 to and from the members 64 the frame 92 is provided with a downwardly extending pin 124, which is slidable in the longitudinal slot, 125, in one end of a transverse bar 126, the other end of which is pivoted to a crank 127, which is rigidly secured to the lower end of the shaft 13.

Figure 19:
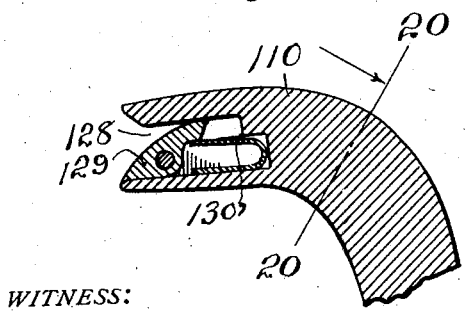
Fig. 19 is an enlarged longitudinal sectional view of one of the knotter heads.
Figure 20:
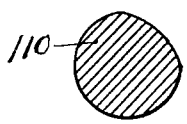
Fig. 20 is a cross section on the line 20—20 of Fig. 19.

As shown in Fig. 19, each knotter head 110 has a curved outer end, which is normally in a horizontal position and which is provided with a mouth 128 for receiving the baling wire. In the mouth 128, there is pivoted to the knotter head 110 a latch or tongue 129, which is normally held in the closed position shown in Figs. 19 and 21 by a U-shaped spring 130', located in the mouth 128.

By reason of the slot 125 in the bar 126, the needles 9 have already begun their swinging movement from the initial position shown in Fig. 1, before the frame 92 carrying the knotter heads 110 starts on its swinging movement from the initial position. For the same reason, the frame 92 remains motionless for a period of time at the end of its stroke from the initial position after the needles 9 have started on their return stroke from the position shown in Fig. 22. During this period of time, the knotter heads 110 are rotated by means of the gears 114 being operated by the disks 106 for the purpose of forming the knots. The different positions of the knotter heads 110 during this period are illustrated in Figs. 22 to 27 inclusive. At the end of the period, the pin 124 in the frame 92 reaches the inner end of the slot 125, and the frame 92 is then swung to its initial position simultaneously with the retraction of the needles 9. At the beginning of the retracting movement of the frame 92, the knotter heads 110 move to the position shown in Fig. 28, thus drawing the held portion 80 of the baling wire out of engagement with the tongue 129, thereby tightening the knot 130, shown in Figs. 28 and 29, after which that portion of the wire 10 which is now being held by the member 64 is cut, and the knotter members and other parts moved to the initial or starting position.

In the initial or starting position, the disk 23 and pawl 26 are in the position shown in Figs. 2, 6 and 7. The wheel 30 is secured on the shaft 7 in a position such that the shoulder 29 on the wheel 30 strikes the pawl 26, when the latter is released from the lever 32, at the time the plunger 2 starts forward on its compression stroke in the baling chamber. The release of the pawl 26 from the lug 34 of the lever 32 is determined by the operator who, after a bale has been compressed, swings the operating lever 36 to the left, as viewed in Fig. 2, and in Fig. 1, thereby swinging the upper end of the lever 32 outwardly, in the manner already described, and releasing the pawl 26 which is swung by the spring 28 into the path of the shoulder 29. The latter engages the pawl 26, thereby starting the disk 23 in rotation from its initial position, shown in Fig. 2. The disk 23 in rotating will turn the disk 18 from the initial position shown in Figs. 2 and 3 through the intermediacy of the rod 22, the crank arm 21 and shaft 19.

In order that the plunger 2 may move forwardly part of its stroke without the shaft 13 and needles 9 starting at once on their swinging movement, the gear 16 is provided on its hub with a flat portion 131, Figs. 3, 4 and 5, which engages the flat inner side of the disk 18, which holds the gear 16 from turning until the disk 18 has turned to a position in which the teeth 17 will engage the teeth of the gear 16. At this time, the gear 16 and shaft 13 are swung from their initial positions, thus swinging the needles 9 inwardly, so that the lips 15 pass respectively under the wires 10, which wires are engaged by the needles in the manner shown in Figs. 35 and 36.

In starting operations with the machine, the wires 10 are first drawn from the reels 11 over the outside of two rollers 132, which are respectively mounted in two brackets 133, Figs. 3 and 13, which respectively straddle the two slots 31 on the side of the frame 1 having mounted thereon the reels 11.

Figure 37:
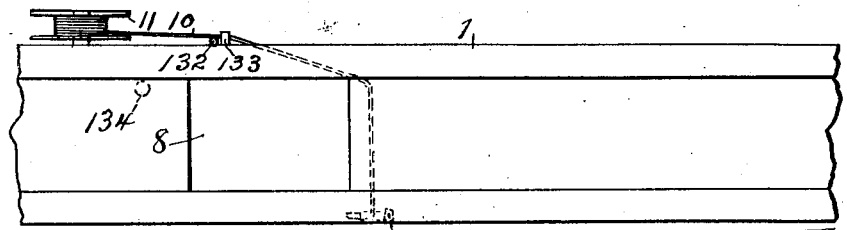

The wires 10 are extended through the slots 31 and are respectively secured at their ends in the two knotter members 64, as is shown in Fig. 37.

Figure 39:
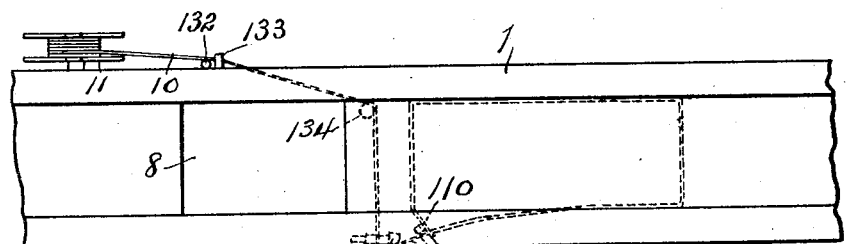
Figure 40:
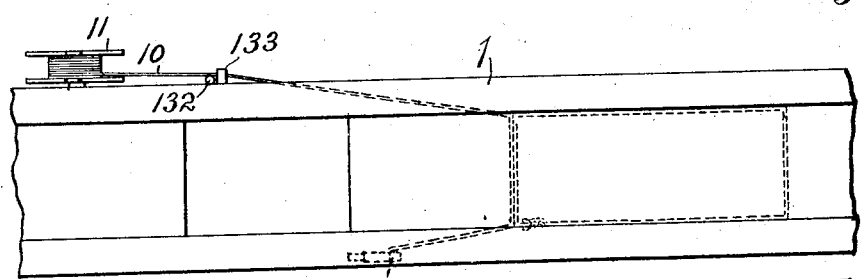

The plunger 2 carries at its forward end two rollers 134, which travel in the adjacent slots 31 and respectively engage the wires 10, so as to force said wires to the transverse position forward of the feed opening 8, as shown in Figs. 37 and 39.

During the forward movement of the plunger 2, the needles 9 respectively enter two transverse slots 135 in the forward end of the plunger 2 and carry the wires 10 tightly against the rear end of the bale past the position shown in Fig. 21, under the lips 78 and into the mouths 74 of the tubular knotter members 64, as shown in Figs. 21, 22, 36 and 39. As shown in Figs. 22, 36 and 39, the wires which are carried across the baling chamber at the rear end of the bale are doubled into U-shape, the wire forming the forward arm of the U being carried over and forward of the lips 78, and the wire forming the rear arm of the U being carried under the lips 78 and into the mouths 74 of the members 64.

As soon as the wires are deposited in the mouths 74, the members 64 are started in their rotation, due to the descending movement of the rack bar 87, Fig. 18, thus carrying the wires which are twisted around the members 64 to the position shown in Fig. 23.

In the meantime, the swinging of the frame 92 brings the knotter heads 110 to the position shown in Fig. 22. The continued revolving of the members 64 brings the wires to the position shown in Fig. 23. At this time, the flat portion 117 of the gear 114 on the shaft 107 strikes the entering end of the track 118, thereby swinging the knotter head 110 with its mouth 128 in the upright position shown in Fig. 23. Continued rotation of the disk 106 will cause the gear 114 to engage the teeth 119, thereby turning the knotter head one complete revolution from the position shown in Fig. 23 through the positions shown in Figs. 24 and 25 to the position shown in Fig. 26.

In passing from the position shown in Fig. 25, the held end of the wire 80 will enter the mouth 128 and will pass the tongue 129, as shown in Fig. 26. The tension of the wire in being wound around the knotter head 110 will draw the member 64 forwardly a short distance, this being permitted by the roller 56 entering the recess 61 on the cam 50. Following this, the projection or lug 58 on the disk 50 will strike the roller 57, thus forcing the members 64 forwardly to the position shown in Figs. 26, at which time the held portion 80 of the baling wire will be released from the mouth 74 by the head 82 of the rod 66 engaging the end of the wire. At this time that portion of the baling wire which is in the mouth 74 will slip out of the notch 75 and will enter the notch 81 of the rod 66, as shown in Fig. 33, at which time the parts will be in the position shown in Fig. 26. At this time the member 64 will have begun its retraction to the initial position in its revolving movement.

A loop will now have been formed around the knotter head 110, as shown in Fig. 26, and the end 80 of the wire will have been released and will be engaged by the tongue 129. At this time the plate 112 will strike the shoulder 123 of the track 113, thus turning the knotter head backwardly to the position shown in Fig. 27. The roller 56 will now pass out of the notch or recess 61 of the cam 50 and onto the portion 60, thus drawing rearwardly the member 64 to the position shown in Figs. 28 and 34, thereby clamping the wire which is in the mouth 74 between the spring plate 79 and the inner wall of the member 64. At this time the gear 45 will be in the space between the teeth 46 and the tooth 47 and the shaft 44 will stop rotation temporarily, while the knot 130 is being tightened, the knot having been formed by the knotter head 110 being retracted and slipping out of the loop of wire, the tongue 129 of the knotter head at the same time pulling the originally held end 80 through the loop to the position shown in Fig. 28.

The needle 9 will by this time have started on its return stroke. Following this the pin 124 will have reached the end of the slot 125 and the bar 126 will have started the frame 92 on its return movement. The knotter head in retracting will pull the knot 130 tight while the wire is being firmly held as shown in Figs. 28 and 34. When this has been done the gear 45 will engage the tooth 47 on the disk 23, thereby turning the shaft 44 to the initial position and causing the cam disk 50 to be turned so that the roller 56 passes from the portion 60 and enters upon that portion 59 from which it started. This movement of the cam 50 will draw the slide bar 52 rearwardly, thereby forcing the knotter member 64 rearwardly to the original position shown in Figs. 21 and 31. In passing to this position, the wall 83 of the rod 66 will cut the wire at the point 84, Fig. 34. The wire will now be free from the knotter head 110, and the wire which is around the bale will be released and the operation of knotting completed. All the parts will now be in the original starting positions and a cycle of the machine will have been completed with the parts as shown in Figs. 1, 2 and 3.

The shoulder 29 of the wheel 30 will have brought the pawl 26 into engagement with the lug 34 of the lever 32. The lug will have drawn the pawl out of engagement with the shoulder 29, and the plunger 2 can now be used in its reciprocation for the formation of another bale. After the new bale has been formed, the operator can swing the operating lever 36 to again release the pawl 26 from the lug 34, after which the shoulder 29 will engage the pawl 26 and another cycle of the machine will be begun and completed in the manner already described.

One of the important novel features of my invention is that the knot is drawn tight before the wire is cut and independently of the bale. Heretofore, so far as I am aware, the expansion of the bale is relied upon to tighten the knot. With devices which operate on that principle, the wire around the bale is not so tight as it is on bales which are bound with my machine, which draws the wire tight before it is cut and independently of the expansion or movement of the bale.

In Figs. 41 to 45, I have illustrated a mechanism having a pointer which indicates the length of the bale which has been formed in the baling chamber, and which is provided with means by which the pointer automatically retracts to the zero or initial position as soon as the mechanism for binding the bale and knotting the wire has been started into operation, and irrespective of the length of bale which has been formed.

136 designates a standard secured to the top of the frame 1 and having a suitably inscribed dial 137. Rotatably mounted in the standard 136 in the center of the dial 137 is a horizontal shaft 138 to one end of which is secured a pointer 139, which cooperates with the dial to indicate the length of the bale 140, which has been formed. To the other end of the shaft 138 is secured a bevel gear wheel 141 which meshes with a gear wheel 142, which is rigidly secured to a vertical shaft 143, which has its upper end mounted in a bearing 144 on the standard 136.

Secured rigidly to the lower end of the shaft 143 is an upper clutch member 145 having teeth on its lower end adapted to interlock with teeth on the upper end of a lower clutch member 146, which is splined to and longitudinally slidable on a vertical shaft 147 disposed in alinement with the shaft 143 and having its upper end rotatably fitted in the lower end of the clutch member 146, as shown in Fig. 44.

The lower end of the shaft 147 has secured rigidly to it a horizontal wheel 148 having peripheral driving teeth 149 adapted to engage the bale 140 and to be driven thereby as the bale moves forwardly. The shaft 147 is rotatably mounted in a bearing 150 secured to the frame 1.

A coil spring 151 encircling the shaft 147 bears at its upper end against the lower end of the clutch member 146 and forces the latter, normally, into engagement with the clutch member 145. The lower end of the coil spring 151 bears against a collar 152 which is secured to the shaft 147 above the bearing 150. The clutch member 146 is provided with a peripheral groove 153 in which is mounted one arm 154 of a bell crank lever, which is pivoted on a horizontal axis to a bearing 155 secured to the frame 1. The other arm 156 of the bell crank lever has pivoted to it a rod 157, the other or rear end of which is pivoted to the crank arm 21.

Attached to the gear wheel 141 is a radial pin 158, which, when the pointer 139 is at the initial or zero position, shown in Fig. 43, bears against the horizontal pin 159 secured to the standard 136, Figs. 41 and 45.

For retracting the shaft 143 and pointer 139 to the initial position, after a bale has been formed and the needles 9 have started across the baling chamber to the knotting position, the shaft 143 has attached to it a flexible member, such as a spring 160, which is attached to one end of a horizontal coil spring 161, the other end of which is attached to a lateral arm 162 of the standard 136.

Figure 38:
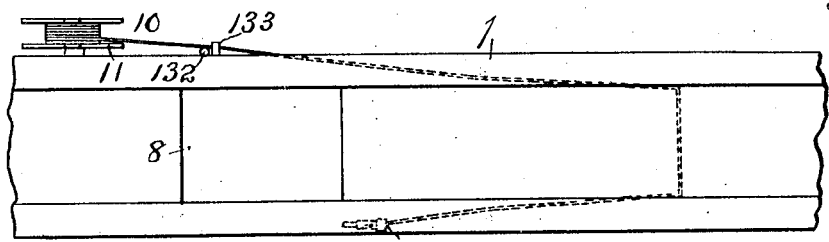

As hereinbefore stated, at the beginning of the formation of a bale, the wires 10 extend across the baling chamber and forward of the feed opening 8, and have their ends attached to the knotter members 64, as shown in Fig. 37. As the hay or straw which is being formed into a bale is fed in the baling chamber through the opening 8, and as the plunger 2 is reciprocated, the wires 10 will be at the forward end of the bale and at the sides thereof, as shown in Fig. 38.

As the bale 140 is being formed and moved to the right, as viewed in Fig. 41, the wheel 148 will be rotated clockwise, as viewed in Fig. 42, thus turning the shaft 147, which in turn by means of the clutch members 146 and 145 will rotate the shaft 143, which by means of the gears 142 and 141 will turn the shaft 138 and with it the pointer 139 in a clockwise direction from the zero or starting point, as viewed in Fig. 43.

As the shaft 143 is rotated, the string 160 will be wound thereon, thereby increasing the tension of the spring 161.

When the operator notes by the position of the pointer 139 that the bale 140 is of the length desired, he stops the feeding of the bale forming material and swings the operating lever 36 to the left, as viewed in Figs.

1 and 2, thereby swinging outwardly the upper end of the lever 32, thus releasing the pawl 26 from the lug 34, upon which the spring 28 will swing the pawl 26 into the path of the shoulder 29 of the continuously revolving wheel 30.

At the time that the plunger 2 starts on its next forward movement, the shoulder 29 will engage the pawl 26, thereby revolving the disk 23 clockwise one revolution, as viewed in Fig. 2.

At the same time, the shaft 19 will be turned in a clockwise direction, as viewed in Fig. 2, by means of the rod 22 and the crank arm 21. This movement of the crank arm 21 will force the clutch member 146 out of engagement with the clutch member 145 through the intermediacy of the rod 157 and the arms 156 and 154 of the bell crank lever. The shaft 143 is now released and will be retracted by the spring 161 and cord 160 until the pin 158 strikes the pin 159, at which time the pointer 139 will be in the initial position shown in Fig. 43.

After the plunger 2 has moved forwardly a short distance, the teeth 17 of the disk 18 will engage the segmental gear 16, thus turning the latter and with it the shaft 13, upon which the needles 9 will start in their swinging movement across the baling chamber in front of the plunger 2. In this swinging movement, the needles 9 will, by their lips 15 respectively engage the wires 10, thereby doubling the wires to the U-form and carrying the wires to the position shown in Fig. 39, at which time the forward arms of the U-shaped wires will be drawn tightly against the rear end of the bale 140, the rear arms of said wires will be carried into the mouths 74 of the knotter members 64.

While the needles 9 are carrying the wires across the baling chamber, the frame 92 will be swung by the bar 126, so as to first bring the knotter heads 110 to the position shown in Fig. 22, in which position the knotter heads will remain, until the tubular members 64 have reached in their revolving movement the position shown in Fig. 23, at which time the held ends 80 of the wires will be carried outside of the bends of the knotter heads 110, and the forward arms of the U-shaped portions of the wires will be forward of the mouths 128 of the knotter heads. At this time, the segmental gears 114 will have their flat portions 117 engage the abrupt ends of the tracks 118, Fig. 14, which tracks will turn the knotter heads 110 to the upright position shown in Fig. 23, in which position they will remain until the teeth of the gears 114 engage the teeth 119, thereby rotating the knotter heads 110 to the position shown in Fig. 25 and then to the upright position shown in Fig. 26, at which time the held portions 80 of the wires will have entered the mouths and have passed the tongues 129 of the knotter heads 110 and will have been released from the knotter members 64, due to the latter having been forced forwardly by the projection 58 striking the roller 57 to the positions shown in Figs. 26 and 33.

The plates 112 will then strike the shoulders 123 of the tracks 113, thus swinging the knotter heads 110 back to the horizontal position shown in Fig. 27, at which time loops in the wires will have been formed around the knotter heads 110.

In the meantime, the disk 23 will have revolved more than a half revolution and the needles 9 will have started on their return across the baling chamber. At this time, the bar 126 will engage and swing the frame 92 toward its initial position, thereby swinging the knotter heads 110 away from the knotter members 64, and the latter will be retracted to the position shown in Fig. 28 by the roller 56 passing on to the portion 60 of the cam 50. At this time, the gear 45 will be between the teeth 46 and the tooth 47, and with the shaft 44 will remain stationary, while the knotter heads 110 are being retracted and the held ends 80 of the wires are being pulled thereby so as to draw the knots 130 tight.

After this has been done, the tooth 47 will engage the gear 45 and will turn the latter to its initial position, thus turning the shaft 44, cam 50, disks 106, slide bar 87 and knotter members 64 to the initial positions shown in Fig. 2. The roller 56 will pass off from the portion 60 onto the portion 59 of the cam 50, thereby fully retracting the knotter members 64 longitudinally to their initial positions and severing the wires 10, as has been described.

When the wires around the bale have been knotted, and severed and the crank arm 21 has returned to the initial position, shown in Fig. 41, the clutch member 146 will have re-engaged with the clutch member 145, and the indicating mechanism will now be in the initial position shown in Figs. 41 to 45, and the plunger 2 will have been retracted to its starting position. The formation of a new bale may now be begun.

Should the operator by an inadvertence let a bale over-run in length before starting into operation the knotting mechanism, or should he start into operation the knotting mechanism before a bale of the usual length has been formed, the pointer 139, nevertheless, will be retracted to the zero position shown in Fig. 43. The pointer 139 will, therefore, always correctly indicate on the dial 137 the length of the bale as it is being formed.

I do not limit my invention to the structure shown and described, as modifications, within the scope of the appended claims, may be made without departing from the spirit of my invention.

What I claim is:—

1. In baling machines, the combination with means for passing a wire around a bale, of two wire holding members one having means for first forming a loop in one of two strands held by the other member and for then independently of expansion of the bale drawing the other strand through the loop, and means for moving one of said members toward the other intermediate of the forming of the loop and the drawing of the strand therethrough.

2. In baling machines, the combination with means for passing a wire around a bale, of means for holding two strands of the wire, means for first forming a loop in one of the strands and for then drawing the other strand through the loop, the first named means having provision for moving the portions of the strands held thereby toward the loop intermediate the forming of the loop and the drawing of the strand therethrough.

3. In baling machines, the combinatiotn with means for holding an end portion of a wire which is at both sides and one end of a bale, of means for doubling into U-shape a portion of the wire and carrying it across the other end of the bale to a position in which one of the arms of the U will be engaged and held by said holding means, and means for knotting together the other arm of the U and said end portion and for completing the knot so formed independently of expansion of the bale.

4. In baling machines, the combination with means for holding an end portion of a wire which is at both sides and one end of a bale, of means for doubling into U-shape a portion of the wire and carrying it across the other end of the bale into a position in which one of the arms of the U will be engaged and held by said holding means, means for knotting together the other arm of the U and said end portion and for completing the knot so formed independently of expansion of the bale, and means for cutting the wire intermediate of said holding means and said knot.

5. In baling machines, the combination with means for holding an end portion of a wire which is at both sides and one end of a bale, of means for doubling into U-shape a portion of the wire and carrying it across the other end of the bale into a position in which one of the arms of the U will be engaged and held by said holding means, means for knotting together the other arm of the U and said end portion and for completing the knot so formed independently of expansion of the bale, and means for cutting the wire after the completion of the knot intermediate of said holding means and said knot.

6. In baling machines, an oscillatory knotter member, a rotary knotter member adapted to co-operate with the oscillatory member to form a knot, and an oscillatory support on which the rotary knotter member is rotatably mounted.

7. In baling machines, a longitudinally reciprocative oscillatory knotter member, a rotary knotter member adapted to co-operate with the oscillatory knotter member, and supporting means on which the rotary knotter member is rotatively mounted and by which the rotary knotter member is first moved toward and then from the oscillatory knotter member.

8. In baling machines, wire holding means, a rotary knotter member having means by which when rotated it will engage wire held by said holding means and form a loop on the knotter member, and having means for engaging an end portion of the wire so held and drawing it through the loop after the knotter member has been moved away from the wire holding means, thereby forming and tightening a knot, and means by which the knotter member is first moved toward the wire holding means, then rotated to form a loop in the wire so held and to engage an end portion of the wire, then retractively rotated to the original position, and then moved away from the wire holding means so as to draw the end portion through the loop and to slip the loop from the knotter member.

9. In baling machines, wiring holding means, a rotary knotter member, supporting means on which the knotter member is rotatively mounted and by which the knotter member is moved toward and from the wire holding means, and means by which the knotter member is rotated to form a loop thereon in wire held by the wire holding means and to engage an end portion of the wire so held with the knotter member and to then rotatively retract the knotter member to a position in which, when the supporting means is retracted to move the knotter member away from the wire holding means, the end portion of the wire will be drawn through the loop to complete the knot and the loop will be pulled off from the knotter member independently of expansion of the bale.

10. In baling machines, a rotary knotter member, a rotary member, and means connecting said members by which when the rotary member is revolved the knotter membed will be rotated more than a complete revolution and then rotatively retracted to its initial position.

11. In baling machines, an oscillatory support, a knotter member rotatively mounted thereon, and means by which the knotter member is revolved more than a complete revolution and then retracted to its initial position.

12. In baling machines, an oscillatory support, a knotter member rotatively mounted thereon, a member rotatively mounted on said support, and means engaging the knotter member and the rotary member by which when the rotary member is revolved, the knotter member will be revolved more than a complete revolution and then rotatively retracted to its initial position.

13. In baling machines, a rotary knotter member comprising a shaft and a knotter head for engaging and holding wire, and means for releasably securing the head to the shaft.

14. In baling machines, a tubular wire holding member having a transverse mouth adapted to receive a wire, and a member longitudinally reciprocative in said tubular member and having means for cutting said wire and for clampingly engaging a portion of the wire when the reciprocative member is moved in one direction to a predetermined position, and provided with means for releasing the engaged portion of the wire when moved in the other direction a predetermined distance.

15. In baling machines, a tubular wire holding member, and a member longitudinally reciprocative in said tubular member, said members having means for clampingly engaging between them a wire and for cutting the wire when the reciprocative member is moved in one direction a predetermined distance, and having means for releasing the held portion of the wire when the reciprocative member has been retracted a predetermined distance.

16. In baling machines, a rotary tubular wire holding member and a member longitudinally reciprocative in said tubular member, said members having means for engaging and holding a portion of a wire and for cutting the same when the reciprocative member is moved in one direction a predetermined distance, and having means for releasing the held portion of the wire when the reciprocative member is retracted a predetermined distance.

17. In baling machines, a tubular wire holding member, and a member longitudinally reciprocative therein and provided with yielding means for clamping a portion of a wire against the tubular member when the reciprocative member is moved in one direction a predetermined distance, said members having means for cutting the wire when the reciprocative member is so moved, said members having means for releasing the clamped portion of the wire when the reciprocative member is retracted a predetermined distance.

18. In baling machines, a longitudinally reciprocative tubular wire holding member, and a member longitudinally reciprocative therein, said members having means for clampingly holding between them and cutting a wire when one of said members is moved in one direction a predetermined distance, and having means for releasing the held portion of the wire when the moved member is retracted a predetermined distance.

19. In baling machines, a longitudinally reciprocative rotary tubular wire holding member, and a member longitudinally reciprocative therein, said members having means for clampingly holding between them and cutting a wire, when one of said members is moved in one direction a predetermined distance, and having means for releasing the held wire when the moved member is retracted a predetermined distance.

20. In baling machines, an axially oscillatable longitudinally reciprocative wire holding member, means cooperative therewith for clamping and cutting a wire engaged by said member, and means for carrying a wire into engagement with said member.

21. In baling machines, an oscillatable longitudinally reciprocative wire holding member, means cooperative therewith for clamping and cutting a wire, means for carrying a wire into engagement with said member, and a rotary knotter member movable toward and from said wire holding member.

22. In baling machines, an oscillatable longitudinally reciprocative wire holding member, means cooperative therewith for clamping and cutting a wire, means for carrying a wire into engagement with said member, a knotter member, and an oscillatory support on which the knotter member is rotatably mounted and by which the knotter member is movable toward and from the wire holding member.

23. In baling machines, an oscillatable longitudinally reciprocative wire holding member, means cooperative therewith for clamping and cutting a wire, an oscillatory needle for carrying a wire into engagement with said member, a knotter member, and an oscillatory support on which the knotter member is rotatable and moved toward and from the wire holding member.

In testimony whereof I have signed my name to this specification.

ELMER R. KOONTZ.